United States Patent Office 3,529,930

Patented Sept. 22, 1970

3,529,930

PROCESS FOR IMPROVING FERROMAGNETIC PROPERTIES OF CHROMIUM DIOXIDE BY HEATING IN AN OXIDIZING ENVIRONMENT

William George Bottjer, Wilmington, and Norman L. Cox, Claymont, Del., assignors to E. I. du Pont de Nemours and Company, Wilmington, Del., a corporation of Delaware No Drawing. Filed Feb. 13, 1968, Ser. No. 705,029
Int. Cl. C01g *37/02;* H01f *1/00*
U.S. Cl. 23—145 5 Claims

ABSTRACT OF THE DISCLOSURE

This invention in its broadest scope encompasses a process for increasing the ferromagnetic properties of ferromagnetic chromium dioxide which comprises heating ferromagnetic chromium dioxide containing surface impurities of chromium compounds of the chromium-oxygen-hydrogen system, said heating being conducted at or near atmospheric pressure and 150° C.–450° C. or pressures from 0.2 to 3000 atmospheres in the presence of an oxidizing agent.

BACKGROUND OF THE INVENTION

It is well known in the art that ferromagnetic chromium dioxide possesses many desirable characteristics which make it useful for certain applications in the manufacture of magnetic recording tapes, magnetic memory recorders, computers and other applications. The preparation of ferromagnetic chromium dioxide can be carried out under high pressures such as the processes described in U.S. Pats. 2,956,955; 3,117,093; and 3,278,263. In Pat. 3,117,093, the higher oxides of chromium, of the general formula $Cr_xO_y$ wherein the ratio of $2y$ to $x$ ranges between 4 and 6, are heated in an aqueous acid medium at pressures ranging between 500 and 3000 atmospheres at temperatures of 250–500° C. The products of the above patents possess very desirable magnetic properties. However, by employing the process of this invention it is possible to improve the desirable magnetic properties to obtain a final product which possesses magnetic properties exceeding those of the original starting material.

Magnetic properties which are particularly important are the intrinsic coercive force ($H_{ci}$), saturation per gram ($\sigma_s$), retentivity or remanence per gram ($\sigma_r$), and the ratio of the remanence to the saturation ($\sigma_r/\sigma_s$). Retentivity and saturation are defined on pages 5–8 of Bozorth's "Ferromagnetism," D. Van Nostrand Co., New York (1951). The sigma values ($\sigma$) herein are determined in a field of 4400 oersteds on apparatus similar to that described by T. R. Bardell, "Magnetic Materials in the Electrical Industry," Philosophical Library, New York (1955) pages 226–228. The definition of intrinsic coercive force, $H_{ci}$, is given in Special Technical Publication No. 85 of the American Society for Testing Materials entitled, "Symposium on Magnetic Testing" (1948), pages 191–198. The values for the intrinsic coercive force given herein are determined on a DC ballistic type apparatus which is a modified form of the apparatus described by Davis and Hartenheim in the Review of Scientific Instruments, 7, 147, (1936).

For the preparation of high quality recording members, it is preferred that the magnetic material possess a saturation, $\sigma_s$, of at least 75 emu/gram. Materials having a saturation per gram above 80 yield particularly desirable products. In this invention the ratio of the remanence to the saturation magnetization ranges up to 0.5. Products having a coercive force of 250–600 oersteds are particularly suited for use in the preparation of magnetic recording members. However, products having a coercive force above 200 oersteds can be satisfactorily used.

DESCRIPTION OF THE INVENTION

Relatively pure $CrO_2$ having satisfactory magnetic properties contains surface chromium compound impurities which can be oxidized by the process of this invention to produce a ferromagnetic $CrO_2$ having magnetic properties which are superior to those of the original starting material. The chromium surface impurities, are throught for the most part to be $CrO_3$ and orthorhombic $CrO(OH)$, which is structurally similar to $CrO_2$ and appears to be grey-black in color. Water-soluble surface impurities can first be removed by water washing if desired but this is not necessary. By the process of this invention, the ferromagnetic $CrO_2$ with the impurities is heated in an oxidizing environment at elevated temperatures causing the surface impurities to be converted to ferromagnetic $CrO_2$. By the process of this invention, it is possible to improve the magnetic properties of a parent ferromagnetic $CrO_2$ having a coercivity, $H_{ci}$, of 250–600 oersteds, a $\sigma_s$ of 75–80 emu/gram (electromagnetic units/gram), a $\sigma_r$ of 31 to 42 emu/gram to an improved ferromagnetic $CrO_2$ generally having a $\sigma_s$ of 83–88 emu/gram and $\sigma_r$ of 35 to 47 emu/gram with only a small change in the coercivity and nearly constant $\sigma_r/\sigma_s$ ratio. The final product unexpectedly possesses ferromagnetic properties which are better than the ferromagnetic properties possessed by the parent compound.

When practicing this invention, it is desirable to use a good quality ferromagnetic $CrO_2$ such as that produced by the process of U.S. Pat. 3,278,263. This preferred produce has a coercive force, $H_{ci}$, of above 200 oersteds, a $\sigma_s$ of above 70 emu/gram and $\sigma_r/\sigma_s$ ratio up to about 0.5. The best products for recording member use have an average particle length less than 1.0 micron and an average particle width less than 0.2 micron with an average axial ratio of at least 3:1 preferably at least 10:1, and ranging up to 40:1 or more. However, uniformity in size is very advantageous since it contributes to uniformity in magnetic properties of the oxide used in preparation of magnetic recording members.

After milling, the ferromagnetic properties are improved by heating the $CrO_2$ containing the surface impurities to 150° C.–450° C. in an oxidizing environment. Sufficient oxidizer must be present to insure complete oxidation of the chromium impurities of the chromium-oxygen-hydrogen system to ferromagnetic $CrO_2$. After treatment, the magnetic properties of the samples are determined as previously described.

The improvement of ferromagnetic properties of $CrO_2$ can be achieved by heating the samples of $CrO_2$ with surface impurities including orthorhombic $CrO(OH)$ in any oxidizing medium as strong as or stronger than nitrous oxide ($N_2O$). Oxidizing components such as air, chlorine, nitrous oxide ($N_2O$), $CrO_3$, sulfur trioxide, bromine, etc. may be used as oxidation sources to improve ferromagnetic properties of $CrO_2$ having surface impurities. It is not necessary that the oxidizing atmosphere be a dry atmosphere since satisfactory results are obtained in oxygen which was presaturated with water at 88° C. Similar results were obtained in moist air.

The temperature limits for treatment of ferromagnetic $CrO_2$ are somewhat dependent upon the oxidizing environment and pressure being used. For instance, when using air at atmospheric pressure as the oxidizing medium, there is a rapid loss of the magnetic properties of $CrO_2$ treated at 430° C. but, in oxygen at 3000 atmospheres upgrading occurs at 450° C. There is therefore an upper limit for the temperature of the oxidation process occurring somewhere between 450° C. to 500° C. dependent on the pressure utilized. Effects at the lower end of the temperature scale are not as pronounced. Evidence of oxidation has been determined at a minimum temperature of 150° C. in oxygen but the rate of upgrading is slower than at the higher cited temperatures. Generally, most satisfactory results in all oxidizing environments are obtained in a temperature range of 275° C.–350° C. at atmospheric pressure.

The time period required for oxidation is temperature dependent. The lower the temperature, the longer the time required to achieve similar degrees of improvement of ferromagnetic properties. For example, 15 minutes at 335° C. in air will produce sufficient oxidation while at a temperature of 260° C., 16 hours is needed to produce equivalent improvement. Good results are obtained when the oxidation process is operated at 315° C.–350° C. for 1–3 hours in air at atmospheric pressure.

The process of this invention is conveniently operated at or near atmospheric pressure but favorable results have been achieved when carried out oxidizing at higher pressures.

The invention will be further illustrated but is not intended to be limited by the following examples.

EXAMPLES 1–2

To prepare degraded $CrO_2$ for testing the upgrading methods, the following procedure for hot-water treatment of ferromagnetic $CrO_2$ was followed for Examples 1–2.

A commercially available Soxhlet extractor was modified by using a glass filter funnel fitted with a sintered glass fritted bottom in place of the normal paper Soxhlet thimble. The glass funnel was supported on a small glass rod to allow the water to percolate through the disc without danger of sealing off the bottom against the rounded bottom of the Soxhlet extractor. The neck of the flask and the extractor tube were then wrapped with an electrical heating tape. Ferromagnetic $CrO_2$ such as that disclosed in U.S. Pat. 3,278,263 and weighing 72.126 grams was analyzed for magnetic properties (summarized in Table 1) and placed in the glass cup in the Soxhlet extractor. The condenser of the Soxhlet extractor was connected to 60° C. circulating water. The heating tape was set to 60° C. In this manner, when the treatment was started, the temperature of the treating water was empirically determined to be 98° C.–1700° C. To prevent splashing of the $CrO_2$, glass wool was placed over the glass cup containing the $CrO_2$ sample. The thermometer, which was set in the condenser of the extractor read 101° C. when the extractor was operating. The ferromagnetic sample of $CrO_2$ was then hot-water treated as above for 184 hours. The sample was then washed with 500 ml. of water to remove water-soluble, trapped residuals. Water washing was followed by washing with 200 ml. of acetone to facilitate drying.

After washing, the sample was placed in a vacuum oven having an air atmosphere at 65° C. and 25 inches Hg vacuum. The sample was thoroughly dried in this manner.

The sample, after drying, was milled so that 100% of the milled particles was less than 42 microns in their greatest dimension.

To improve the magnetic properties of the samples in an oxidizing atmosphere, a portion of the hot-water treated, milled sample was placed in a platinum boat which was in turn placed in a glass reaction tube fitted with a thermocouple well. The glass reaction tube was placed in a tube furnace. The oxidizing gas source was connected to a scrubber containing glass wool. A rotameter, to measure the gas flow, was connected between the scrubber and the tube furnace which housed the glass reactor tube. The resistance-wound tube furnace, controlled by a regulator, was connected to a surge bottle, followed by a double bubbler air lock filled with water to form a seal. Before the sample was charged in the tube furnace, the system was completely purged with the gas to be used as the oxidizing gas source. The sample was charged and the system was then heated and operated at 320° C. for 6 hours followed by cooling of the sample in the gas flow. After cooling, the reconverted $CrO_2$ samples were analyzed with the results as indicated in Table 1.

When oxidizing in chlorine, Example 2, the sample was placed in a fused alumina refractory boat rather than a platinum boat because platinum reacts with chlorine at the operating temperatures used.

In Example 1, the air flow rate was an average of 175 ml./min. The same flow meter and flow meter setting was used with chlorine. The gas flow of the chlorine was approximately 96 ml./min.

TABLE 1

| Ex. No. | Product analyzed | Oxidizing atmosphere | $H_{ci}$, oe. | $\sigma_s$, emu/g. | $\sigma_r$, emu/g. | $\sigma_r/\sigma_s$ |
|---|---|---|---|---|---|---|
| | Parent $CrO_2$ | | 420 | 83.1 | 38.7 | 0.465 |
| | Degraded $CrO_2$ | | 455 | 31.1 | 14.3 | 0.460 |
| 1 | Oxidized $CrO_2$ | Air | 487 | 86.7 | 42.1 | 0.486 |
| 2 | do | $Cl_2$ | 480 | 83.8 | 40.7 | 0.487 |

EXAMPLE 3

A relatively pure sample of $CrO_2$, such as that used in Examples 1–2 was analyzed and the following magnetic properties determined:

$H_{ci}$—382 Oe; $\sigma_s$—82.6 emu/g.; $\sigma_r$—38.0 emu/g.; $\sigma_r/\sigma_s$—0.459.

This sample was not submitted to any hot-water treatment as in Examples 1–2 but was oxidized without any preliminary treatment. Crystalline surface impurities of the initial $CrO_2$ were determined to be principally CrO(OH). A sample of this $CrO_2$ weighing 20 grams was charged in a platinum boat and placed in a tube furnace similar to that used in Examples 1–2. Oxygen was used as the oxidizing atmosphere. After heating of the surface-contaminated $CrO_2$ to 400° C. for 15.75 hours, the oxidized sample was analyzed and the following results determined:

$H_{ci}$—371 Oe; $\sigma_s$—86.6 emu/g.; $\sigma_r$—39.5 emu/g.; $\sigma_r/\sigma_s$—0.456.

EXAMPLE 4

Example 3 was repeated with ferromagnetic $CrO_2$ having the following mganetic properties:

$H_{ci}$—411 Oe; $\sigma_s$—81.8 emu/g.; $\sigma_r$—37.9 emu/g.; $\sigma_r/\sigma_s$—0.464.

A 20-gram sample of the above $CrO_2$ was treated as in Example 3 except that air was used as the oxidizing atmosphere at 335° C. for 2 hours. The following results were obtained:

$H_{ci}$—411 Oe; $\sigma_s$—85.6 emu/g.; $\sigma_r$—39.6 emu/g.; $\sigma_r/\sigma_s$—0.463.

EXAMPLE 5

The Soxhlet extractor treatment as described in Examples 1–2 was repeated except that anhydrous ethanol in the absence of air was used in place of the hot water. The ferromagnetic $CrO_2$ was treated in anhydrous ethanol at 60° C. for 24 hours.

The treated $CrO_2$ mixture was then treated in oxygen as in Example 3 at 350° C. for 18.5 hours. Upgraded magnetic properties are shown in Table 2.

TABLE 2

| | $H_{ci}$, oe. | $\sigma_s$, emu/g. | $\sigma_r$, emu/g. | $\sigma_r/\sigma_s$ |
|---|---|---|---|---|
| Parent $CrO_2$ | 382 | 82.6 | 38.0 | 0.459 |
| Degraded $CrO_2$ | 435 | 68.2 | 32.1 | 0.471 |
| Oxidized $CrO_2$ | 372 | 86.3 | 40.1 | 0.465 |

EXAMPLE 6

Example 1 was repeated except that hot-water treatment occurred for 334 hours. Treatment of the ferromagnetic material was also the same as in Example 1 except that the oxidizing environment was at a temperature of 335° C. for 22 hours. The results are summarized in Table 3.

TABLE 3

| | $H_{ci}$, oe. | $\sigma_s$, emu/g. | $\sigma_r$, emu/g. | $\sigma_r/\sigma_s$ |
|---|---|---|---|---|
| Parent $CrO_2$ | 420 | 78.3 | 36.0 | 0.460 |
| Degraded $CrO_2$ | 462 | 35.3 | 16.5 | 0.468 |
| Oxidized $CrO_2$ | 469 | 83.4 | 40.2 | 0.482 |

EXAMPLE 7

A sample of chromium dioxide was prepared according to Cox U.S. Pat. 3,278,263. A sample of this material was heated in air for one-half hour at 335° C. A comparison of the magnetic properties of the original sample and the upgraded product are as follows:

| | $H_{ci}$, oe. | $\sigma_s$, emu/g. | $\sigma_r$, emu/g. | $\sigma_r/\sigma_s$ |
|---|---|---|---|---|
| Parent $CrO_2$ | 411 | 37.9 | 81.8 | 0.464 |
| Oxidized $CrO_2$ | 406 | 39.4 | 84.0 | 0.469 |

The use of $CrO_3$ as an oxidant has also proven effective in upgrading the magnetic properties of $CrO_2$ at a temperature of about 335° C. and atmospheric pressure. Upgrading with $CrO_3$ can be accomplished without the presence of air.

EXAMPLE 8

Ferromagnetic $CrO_2$ can be upgraded using an oxygen environment at 450° C. and 3000 atmospheres. Saturation magnetization ($\sigma_s$) of a sample was increased from 80 to 86 and coercivity ($H_{ci}$) was slightly reduced from 375 to 352 Oe.

The expressly degraded $CrO_2$ used in some of the above examples aids in showing the improvement of this invention. However, as a practical matter the $CrO_2$ used in this process would not be exposed to such detrimental conditioning. Most of the $CrO_2$ improved by this process would be of the grade prepared by processes such as that of U.S. Pat. 3,278,263.

In general, stoichiometric amounts of oxidizer to chromium impurities are needed for the process. As a rule the amount of impurities on the surface of a $CrO_2$ particle can be estimated by the saturation magnetization ($\sigma_s$) of the $CrO_2$. An excess of oxidizer is used to insure the desired results. Gaseous oxidizers (e.g. air, oxygen, chlorine) are preferably employed due to the ease of contacting the $CrO_2$ with the oxidizer, with oxygen being preferred at the higher temperature.

Upgraded ferromagnetic $CrO_2$ produced by this process offers many advantages. A convenient, economical means of obtaining ferromagnetic $CrO_2$ which possesses superior magnetic properties is a leading advantage of this invention. The improved $CrO_2$ produced by this invention is useful in any of the applications for which $CrO_2$ is commonly employed, namely in the manufacture of magnetic memory cores for computers, and especially in magnetic recording tapes.

By employing the process of this invention, it is possible to improve the magnetic properties of $CrO_2$ such that the ferromagnetic properties of the improved $CrO_2$ exceed those of the parent $CrO_2$ without a substantial change in coercivity. Improved ferromagnetic $CrO_2$ produced by this process is useful when high resolution is a problem since the coercivity is preferably in the range of 250–600 oersteds. The improved ferromagnetic chromium dioxide prepared by this invention can be used for magnetic coatings for recording tapes, drums, records, memory cores, card computers and other magnetic uses.

The embodiments of the invention in which an exclusive property or privilege is claimed are defined as follows:

1. A process for improving the ferromagnetic properties of ferromagnetic $CrO_2$ particles having
   (a) an average length of less than 1 micron, an average width less than 0.2 micron, and an average axial ratio of at least 3:1; and
   (b) a coercive force above 200 oersteds, a $\sigma_s$ of above 70 emu/g., a $\sigma_r/\sigma_s$ ratio up to about 0.5, said particles having surface impurities including orthorhombic CrO(OH); said process being characterized by heating the ferromagnetic $CrO_2$ particles at a temperature of about 150° C. to 450° C. and under a pressure of 0.2 to 3000 atmospheres while providing an oxidizing environment around said ferromagnetic $CrO_2$.

2. A process according to claim 1 wherein said temperature is 275° C. to 350° C., said pressure is about 1.0 atmosphere and said environment is provided by air.

3. A process according to claim 1 wherein said temperature is 275° C. to 350° C., said pressure is about 1.0 atmosphere and said environment is provided by oxygen.

4. A process according to claim 1 wherein said oxidizing environment is provided by air, oxygen, chlorine, bromine, nitrous oxide, sulfur trioxide or chromium trioxide.

5. A process according to claim 1 that is carried out in the absence of water.

References Cited

UNITED STATES PATENTS

| | | | |
|---|---|---|---|
| 2,714,054 | 7/1955 | Voltz | 23—145 |
| 2,885,365 | 5/1959 | Oppegard | 252—62.51 |
| 3,278,263 | 10/1966 | Cox | 23—145 |

OSCAR R. VERTIZ, Primary Examiner

H. S. MILLER, Assistant Examiner

U.S. Cl. X.R.

252—62.51